United States Patent [19]

Ellis et al.

[11] Patent Number: 4,894,516
[45] Date of Patent: Jan. 16, 1990

[54] ELECTRICAL STORAGE HEATERS

[75] Inventors: Gordon Ellis, Bramshall; Richard J. Lane, Stone, both of United Kingdom

[73] Assignee: Creda Limited, Staffordshire, United Kingdom

[21] Appl. No.: 231,033

[22] Filed: Aug. 11, 1988

[30] Foreign Application Priority Data

Aug. 11, 1987 [GB] United Kingdom ............... 8718965

[51] Int. Cl.$^4$ ............................................. H05B 1/00
[52] U.S. Cl. ..................................... 219/378; 219/365
[58] Field of Search ................. 219/378, 365, 364; 165/18, 40; 126/400

[56] References Cited

U.S. PATENT DOCUMENTS 4,097,719 6/1978 Olsen et al. ..................... 126/400
4,473,740 9/1984 Ellis .................................. 219/378

FOREIGN PATENT DOCUMENTS 2433517  1/1976  Fed. Rep. of Germany ...... 219/364
891040  3/1962  United Kingdom ................ 219/365
1190323  5/1970  United Kingdom ................ 219/365
2097912A 11/1982  United Kingdom .

Primary Examiner—Derek S. Jennings
Assistant Examiner—Geoffrey S. Evans
Attorney, Agent, or Firm—Spencer & Frank

[57] ABSTRACT

An electric storage heater which is heated from a source of electricity made available only over an off-peak (low tariff) period. The heater includes an air flow control mechanism comprising a damper in the form of a flap (10) controlled by bimetallic elements that can be set at any stage during an on-peak period (such as a manually operative boost switch to increase the heat output of the heater) and automatically reset during the next subsequent off-peak period.

12 Claims, 4 Drawing Sheets

ELECTRICAL STORAGE HEATERS

BACKGROUND OF THE INVENTION

This invention relates to electrical storage heaters of the kind (hereinafter referred to as being of the kind specified) comprising a heat store, electrical heating means for heating same, a circuit (herein called the charging circuit) including charge control means for regulating the flow of current to the electrical heating means during an off-peak charging period, means providing for flow of air or other heat distributing fluid (herein for convenience referred to as air) into contact with the heat store and thereafter to a space or place to be heated, and flow control means for controlling the flow of said air.

The electrical heating means is ordinarily powered from an electrical supply source (herein called the off-peak supply) which is operative, i.e. rendered live, by timed controlled switch means not accessible to the user for one or more restricted periods (herein called off-peak periods) during each basic twenty four hour period. One of such off-peak periods which is frequently utilised extends from 2400 hours to 0700 hours and in some cases a second off-peak period is provided extending from 1300 hours to 1500 hours.

In our European Patent Application 80301045.3 we have disclosed and claimed an electrical storage heater of the kind specified in which the flow control means is adjusted to regulate flow of air as a function of both the temperature of the heat store and the temperature of air entering the heater from the space or place to be heated.

The control aspect with respect to the temperature of the heat store, although adequate to ensure that external parts of the heater casing which the use may touch, such as the heater output grille, are never dangerously hot, is unable to offer an identical heat output characteristic independently of the amount of heat stored at the beginning of each day (on-peak) period. Such adjustment as is necessary must be effected by the use of a manually adjustable control member. For example, a unit which is manually adjusted for cold weather operation (maximum stored heat) may have the flow control means gradually opening towards the latter part of the day, say evening, in order to boost the heat output when the naturally-cooling casing of the heater is emitting less heat than earlier. On a subsequent (warmer) day, when the off-peak heat storage is less, and the heater starts the day with less heat stored and is of lower general temperature at the casing, the flow control means, left without alteration to its manual adjuster knob, will operate on a different characteristic and will undesirably boost the heat output earlier, leaving the evening period without sufficient heat.

In our British Patent GB 2097912B we have disclosed and claimed on electrical storage heater of the kind specified in which the charge control means is responsive to the temperature of air in the space or place to be heated (and hence indirectly to weather temperature). One of the problems encountered is that although control of the flow control means as a function of store temperature and temperature of the air in the space or place to be heated (during an on-peak period) provides a satisfactory degree of sophistication in terms of attaining the level of heating desired by the user while maintaining optimum or near optimum economy, performance can be upset by changes in weather temperature occurring between the terminal portion of the preceding off-peak period (when the level of charge is determined at least in part by weather temperature) and the on-peak period in question.

However there do occur variations in the heating parameters which desirably are accommodated for in the control of the output from the heater, for example when, due to a mild night, the level to which the heater is charged during the off-peak period is reduced.

Where the temperature of the room is to remain at a relatively high level, no problem would be encountered, since the sensed reduction in the temperature of the heat store would be opposed by the sensed increase in the temperature of the room being served. However, should the room temperature return to its original temperature, the combined effect of the temperature sensing elements would cause a response similar to a reduction in room temperature, and in consequence would produce an increase in the temperature of the room being served, causing an unduly high rate of heat dissipation.

SUMMARY OF THE INVENTION

According to this invention there is provided an electrical storage heater of the kind specified wherein the flow control means has associated therewith a setting means which is operative during an on-peak period to vary the heat flow from the heater, and resetting means to cancel the setting on the setting means during the next subsequent offpeak period.

The setting means may be one which may be operational at any stage during an on-peak period, and may for example be a manually-operative "boost" switch adapted for manual actuation to increase the heat delivered by the heater, the resetting means being operative to reset the boost switch during the next subsequent off-peak period, i.e. prior to commencement of the next on-peak period.

Alternatively the setting means may be automatically operative at the beginning of an on-peak period, and may for example be operative to induce a bias to compensate for the level of charging of the heater at the end of one off-peak period, the resetting means being operative to remove the bias on commencement of the next subsequent off-peak period in preparation for the provision of another, possibly different bias at the end of said next off-peak period.

Conveniently the flow control means of the heater comprises a damper or valve element movable relative to an air flow passage extending through the store to control air flow therethrough, the setting means being operative to adjust the initial setting of said element.

Advantageously the setting means comprises a thermo-motive element partaking of the temperature of the store to provide an output for operating the setting means.

Alternatively the setting means may be manually operated.

Advantageously the setting means includes latch means for holding the setting means in its adjusted position, the resetting means moving the latch means to an inoperative position during each off-peak period.

Alternatively or in addition, particularly where the setting means in manually operative, the resetting means may be operative physically to return the setting means to a base position.

Conveniently the initial setting of the damper or valve element may be determined by a stop element in the setting means, such stop element being itself positionally adjusted by the thermo-motive element, and being held in its adjusted position by said latch means.

Advantageously the flow control means comprises a member which is movable to vary the response of the flow control means to predetermined input parameters (i.e. the outputs form temperature sensing elements), and the setting means comprises a latch member which may restrain the movable member in a set position in which a desired bias to the response of the flow control means is obtained.

Preferably the resetting means also comprises a thermo-responsive element, desirably one which is activated during charging of the storage heater, to move the latch from engagement with the flow control means.

DESCRIPTION OF THE PREFERRED EMBODIMENTS

Figure 1:
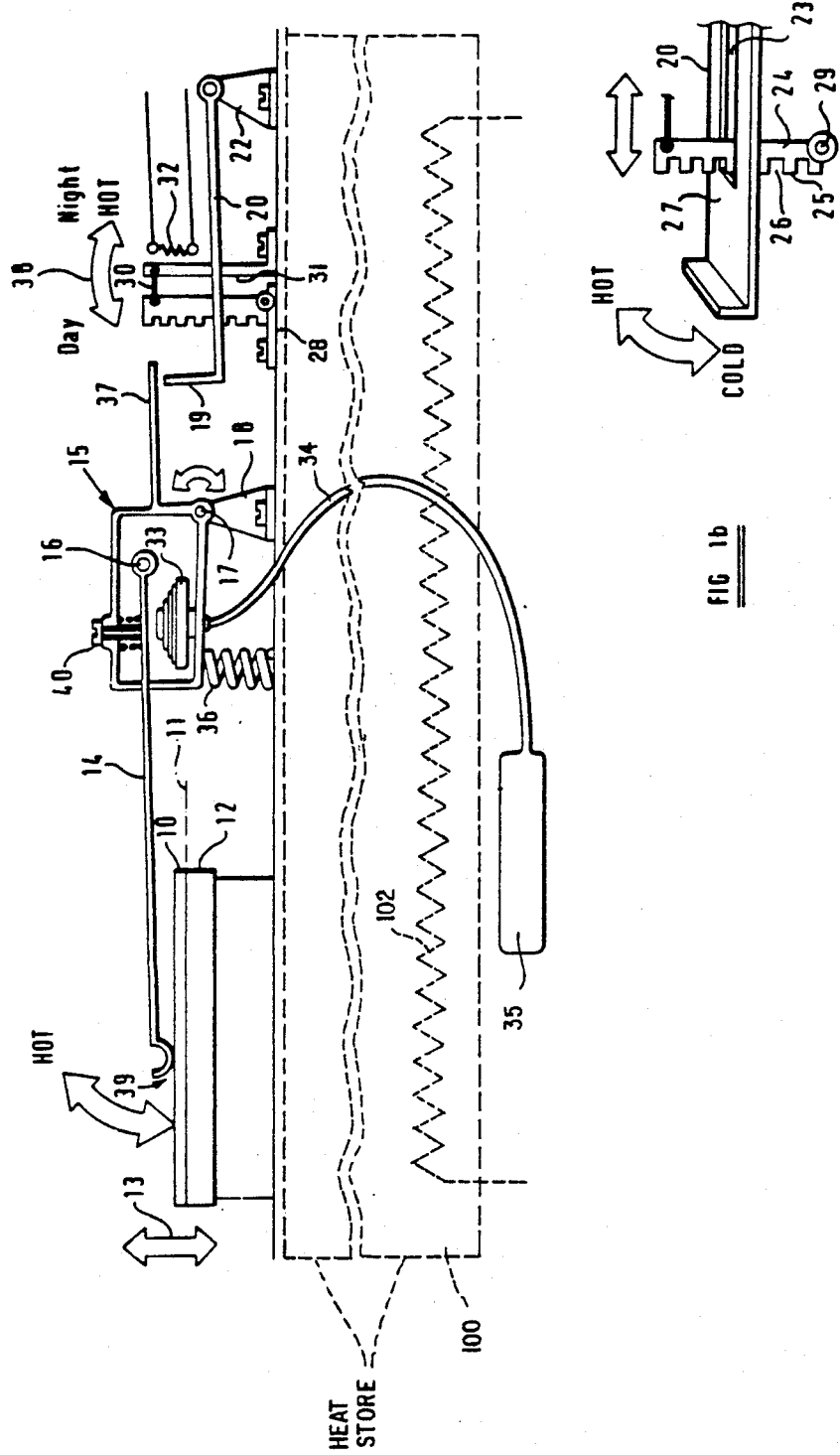
FIGS. 1a and 1b show in schematic form a first embodiment of flow control means and associated setting means.

Generally, the heater which is the first embodiment of this invention is of the form more fully disclosed in our previously mentioned European applications and British Patent except for substitution of the flow control means and associated setting means snow described.

Thus the heater may comprise a solid state body or heat store 100, which is shown only schematically in FIG. 1a and which incorporates a system of passageways extending upwardly from inlets to outlets, the latter being controlled by air flow control means comprising a damper or valve element in the form of a flap 10 pivoted about a horizontal axis 11 offset to one side (e.g. the rear side as illustrated) of a frame element 12 forming the outlet of the system of passageways.

The flap 10 is biased towards its shut position and can be moved towards its open position as indicated by arrow 13 by downward pressure exerted by an arm in the form of a bi-metal strip 14.

The bi-metal strip 14 is in turn supported from a carrier in the form of a housing 15 to which it is pivoted about a horizontal axis 16 transverse to the length of the arm, the frame itself being pivoted about a horizontal transverse axis 17 to a bracket 18 or other fixed support mounted at the upper end of the heater.

The pivotal movement of the frame 15 in a clockwise direction is limited by a stop element 19, forming part of a setting means of the heater, projecting upwardly from one end of a further bi-metal strip 20 which in turn is supported from a bracket 22 carried by any suitable fixed part of the heater in such a manner that it deflects upwardly for increase of store temperature and downwardly for decrease in store temperature.

The bi-metal strip 20 is formed with a central medially extending slot 23 (see FIG. 1b through which projects one element of a latch means comprising a strip 24, one edge of which is formed with a series of teeth 25 and intervening slots 26 which can co-operate with the other element of the latch means formed by the marginal portion 27 of the strip 20 bordering the adjacent end of the slot 23.

The strip 24 is mounted on a fixed bracket 28 for pivotal movement about a transverse horizontal axis 29 and is connected by a link 30 to an upstanding bi-metal strip 31 of a resetting device of the heater which is secured to a fixed part of the heater and with which is associated an electrical heating element 32 connected in the charging circuit of the heater so as to be energised whenever heating current its being passed through the electrical heating means 102 of the store 100 from the off-peak supply.

Within the frame 15 there is provided a capsule or bellows 33 connected by a pipe 34 to a heat sensing element 35 in the form of a phial, the phial, pipe, and bellows containing a liquid, the vapour pressure of which rises in response to rise of temperature.

The phial 35 is sited adjacent to an inlet of the passageway system already referred to so as to partake of the temperature of the air in the space or place to be heated and which enters the heater and flows convectively through the passageway system of the store when the flap 10 is in its open position.

Control of the charging current during the off-peak period is determined by an automatically operating charge control means responsive to the parameters of the store temperature and the temperature of the space or place to be heated (which is indirectly related to weather temperature) possibly by the means described and claimed in our British patent GB 2097912B, already referred to.

The manner of operation of the setting means associated with the flap and bi-metal strip is as follows.

During an off-peak period, current flows through the heating element 32 and causes the bi-metal strip 31 to bend to the right as seen in the drawing. The bi-metal strip 20 which is supported cantileverwise from the bracket 22 is then free to bend upwardly or downwardly according to the temperature to which it is subjected and thereby raise or lower the position of the stop element 19.

The strip 20 is sited so as to partake of the store temperature. Thus, it may be situated adjacent to part of the insulating covering of the store 100 but on the outside of the covering.

A spring 36 acting between the frame 15 and a fixed part of the heater urges the frame clockwise, and maintains contact between the tail section 37 of the frame 15 and the upwardly presented edge face of the stop element 19.

Ordinarily, operation in this mode will take place during the nightime off-peak period as signified diagrammatically by the arrow 38 showing rightward deflection of the strip 31 and corresponding rightward deflection of the toothed strip 24.

At the end of, or during the terminal portion of, the off-peak charging period, the charge control means will cause current to be cut off from the element 32 and the strips 31 and 24 will move anti-clockwise to the "day" position, causing the toothed edge to interengage with the margin 27 and holding the bi-metal strip 20 and stop element 19 in the position which they then occupy and which will be a function of store temperature at the end of, or in the terminal portion of, the off-peak charging period. In this manner a bias is introduced to vary the manner in which the flow control means responds to the input signals, to compensate for the level of charging of the device at the end of the offpeak period.

This will control the setting of the flow control means in the sense that it will control the dimensions of a gap between the left-hand end of the bi-metal arm 14 and the flap 10 at the position indicated by arrow 39.

Possibly however, the bi-metal arm 14 may already be exerting downward pressure on the flap 10 at a position to the rear of axis 11 but insufficient pressure to cause the flap to open against its own weight. The position of a stop element 19 will then determine the magnitude of such pressure, and the term "setting" as herein used is to be deemed to refer either to the gap or to the pressure as appropriate.

During the subsequent on-peak period, the primary factors determining the point at which the flap 10 opens will be the temperature to which the bi-metal strip 14 is subjected and the temperature to which the phial 35 is subjected as more fully described in our European Application already mentioned. A higher temperature in respect of the store 100 causes the bi-metal strip 14 to bend upwardly and a higher temperature in respect of the phial 35 causes the strip 14 to pivot relatively to the frame 15 about an axis 16 to a limit determined by the position of the stop element 40 which may be in the form of an adjustable screw as shown.

When both temperatures however are low enough (causing the strip 14 to bend downwardly and the capsule or bellows 33 to contract its vertical dimension) the downward pressure upon an extension of the flap on the remote side of the axis 11 will cause the flap to open.

If the temperature to which the store 100 has been charged is lower (in consequence of a mild weather temperature) the bi-metal strip 20 will have bent towards a lower position and will have become latched in that position and so opening of the flap 10 in the succeeding on-peak period will be delayed.

In the event of a low weather temperature during the off-peak charging period, the store 100 will have charged to a higher temperature, the bi-metal strip 20 will have bent upwardly raising the stop element 19 to decrease the gap or increase the downward pressure existing between the strip 14 and the flap 10.

All the operating elements of the device, except the elements 31 and 32, are thermo-motive and derive their energy from the air in the space or place to be heated or from the store and therefore do not require to draw any current from the on-peak supply.

On commencement of the next subsequent off-peak period, the resetting bi-metal element 31 will be heated by the heating element 32 (located in the charging circuit), causing the bi-metal 31 to move to its "night" position, disengaging the toothed formation from the bi-metal strip 20. In consequence, the bi-metal strip 20 will be free to move to a possibly different position during recharging of the heater, in the terminal position of which it will be re-engaged by the latch at the end of that offpeak period.

The heater which is the second embodiment of this invention is generally similar to the first embodiment above described, and similar numerals with the suffix a have been used to indicate elements of the heater similar to those described in detail in the first embodiment.

In the second embodiment the housing 15a is pivotally mounted on a bracket 18a, the actuating bi-metal arm 14a 4a being pivotally mounted on the housing at 16a. Extending rearwardly from the housing is a tail section 37a.

However in the second embodiment a bi-metal setting element 40 is interposed between the actuating arm 14a and the flap 10a of the damper. Mounted behind the tail section 37a is a latch element 24a, provided with teeth 25a, secured by a link 30 to a bi-metal lock release mechanism 31a, affording the resetting means of the heater. As with the first embodiment the bi-metal strip 31a is adapted to be heated by a heating element 32a during charging of the heater, the "day" position being shown in FIG. 2a, and the "night" position being shown in FIG. 2b.

Figure 2:
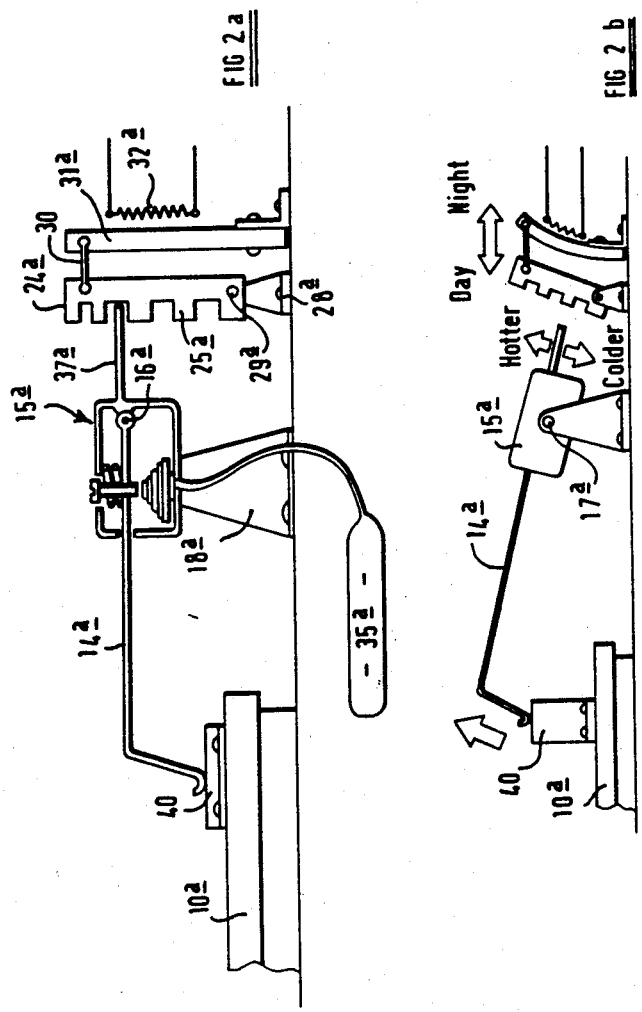
FIGS. 2a and 2b show in schematic form a second embodiment of flow control means and associated setting means.

During an off-peak period, when charging of the heater occurs, the latch element 24a adopts a position in which the housing 15a is free to pivot on about its horizontal axis 17a. The bi-metal setting element 40 is located at a position in which it responds to the temperature of the heat store, and will "elevate" (as is shown in FIG. 2b) to push the housing 15a in a clockwise direction in accordance with the level of charging of the heat store. At the end of the off-peak period, when the heating of the element 32a is removed, the bi-metal strip 31a will move the left, causing the latch element 24a to pivot about its axis 29a in an anti-clockwise direction. As a result, the teeth 25a, move into engagement with the tail section 37a, retaining the housing 15a in the angular position about axis 17a.

In this manner, at the end of an off-peak charging period the contact between the bi-metal strip 14a and the flap 10a is maintained irrespective of the level of over night charging, and the flow control means is unaffected by the fact that the actuating arm 14a is effectively observing (under conditions of maximum charge) a higher temperature than would be the case with a level charge below maximum. Thus a compensation has been provided which renders the flow control means more able to respond accurately to an input signal provided from the heat sensing phial 35a.

As with the first embodiment, upon commencement of the next off-peak charging period, the bi-metal element 31a will flex to the right, pulling the latch element 24a from engagement with the tail section 37a, preventing opening of the flap 10a and permitting the housing 15a to find a new angular position, determined by the level of charging which takes place, for subsequent re-latching at the end of that charging period.

The heaters described and illustrated above are similar in that both are provided with means automatically to bias the flow control means, in accordance with the level to which the heater is charged during each offpeak period.

However as has been described above, the problems with which the present invention are concerned also occur in heaters provided with manual flow control means, such as may be provided to boost the flow of heat provided by the heater, particularly at night towards the end of an on-peak period. In the flow control means of such heaters, conventionally not only is there provided a user selection control, which by rotation may be set to provide the required heat output characteristics, but also a means which may be moved to a "heat boost" position as desired.

The heater which is the third embodiment of this invention is such a heater, being in other respects similar to the heater described in relation to FIG. 1, and in relation of which the same numerals with the suffix b have been used to indicate similar parts.

In the third embodiment the flow control means comprises a housing 15b mounted on a pivot 17b, and urged by a spring 36b in a clockwise direction.

On the housing for movement about a pivot axis 16b, is a bi-metal control arm 14b, on end portion of the arm being provided with a tip 39b adapted to engage a flap (not shown) of a damper of the heater.

As with the first and second embodiment, downward movement of the tip 39b produces pivotal movement of the flap, causing opening of the damper and release of heated air.

The position of the control arm 14b is determined by a rotary control knob 42, a stem portion of which presses against the arm 14b to urge it in an anti-clockwise direction, whilst to the left thereof a bellows 33b acts against the arm to urge it abouts its pivotal axis 16b in a clockwise direction, under the action of expanding fluid in a heat sensing phial 35b.

Adjacent to a tail section 37b of the housing 15b is a bi-metal latch element 24b, adjacent to which a heating element 32b extends, the heating element 32b being in the charging circuit of the heater, and being adapted to be heated during the off-peak charging period.

Figure 3:
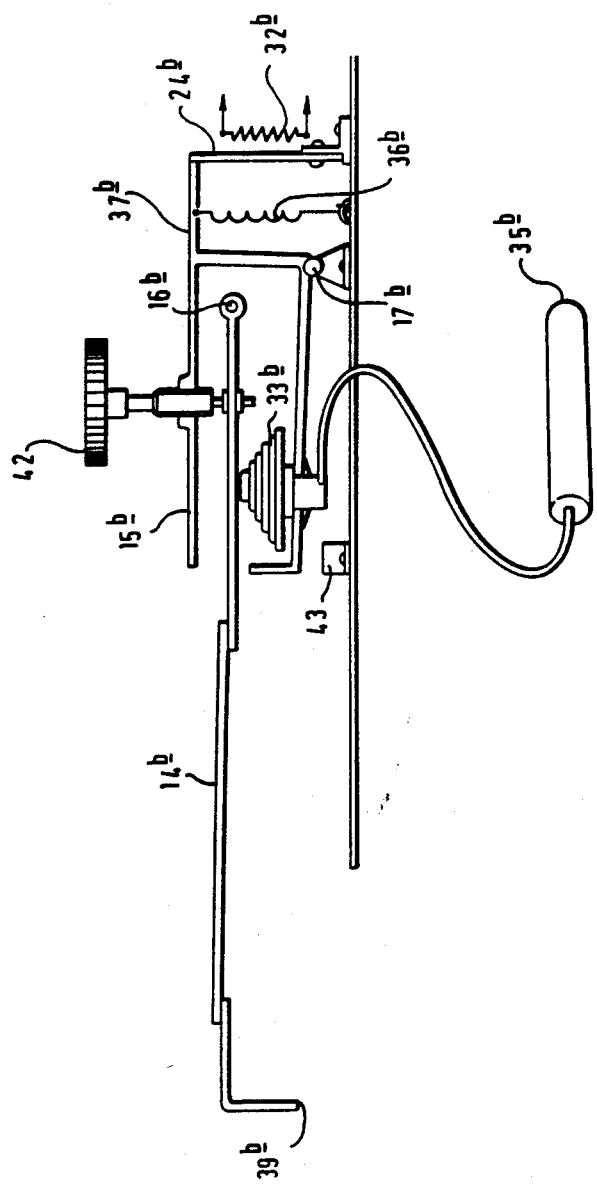
FIG. 3 shows in schematic form a third embodiment of flow control means and associated setting means.

The latch element 24b is shown in FIG. 3 in its rest position during an on-peak period, in which its natural resilience urges it into contact with the tail section 37b.

The flow control means of the third embodiment comprises a "heat boost" means, which may be provided by the control knob 42 or an additional control knob, by which the housing 15b may be urged as a whole in an anti-clockwise direction about its pivotal axis 17b, into engagement with a stop 43. Such movement causes the actuator tip 39b to move the flap into a more open position, to increase the rate at which heat flows from the heater.

During such movement of the housing 15b, the latch element 24b passes beneath the tail section 37b retaining the housing in a position in which the delivery of heat is boosted as has been described.

However at the end of the on-peak period, and on commencement of charging of the heater, the heating element 32b causes heating of the bimetal match element 24b, causing movement thereof to the right, from beneath the tail section 37b, permitting the spring 36b to pull the housing to its "unboosted" position, conveniently defined by a further stop (not shown) against which the housing is pulled in a clockwise direction by the spring 36b. In this manner, the bias provided by operation if the "boost" control is removed prior to commencement of the next on-peak period, and ensures that an unduly high release of heat from the heater is not inadvertently produced by failure to release the boost control manually.

Figure 4:
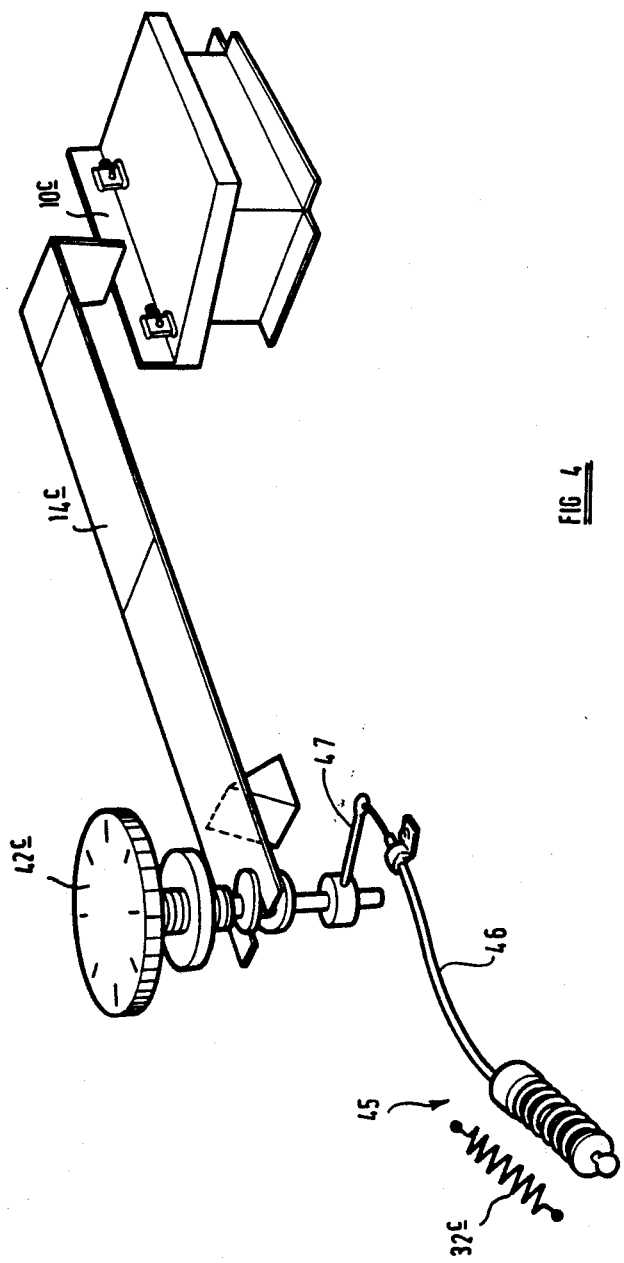
FIG. 4 shows in schematic form a fourth embodiment of flow control means and associated setting means.

The heater which is the fourth embodiment of this invention is illustrated in FIG. 4, in which similar numerials with the suffix c have been used to denote like parts, is also similar to the first embodiment described above and illustrated in FIG. 1. However in the fourth embodiment the setting means is afforded solely by a manually operable control knob 42c, which is used to determined the base position of the control arm 14c. In practice, the control knob is movable from a "minimum" position corresponding the normal temperature at which it is desired to maintain the room being served, and may be used (particularly during the latter part of an on-peak period) to a higher setting to increase the rate of delivery of heat.

In the fourth embodiment, a resetting device 45 is used, which is adapted to be heated by a heating element 32c which is in a charging circuit of the heater. The resetting device 45 is of the type referred to as a "magic spring", which produces a significant degree of movement in response to small specific temperature changes. The "magic spring" element is connected to a bowden cable 46, the inner member of which is connected to an arm 47 attached to the control knob 42c. In this manner on commencement of an off-peak charging period, heating of the resetting device occurs causing the bowden cable 46 to contract, moving the arm 47 in a clockwise direction to return the user control knob 42c to its rest position.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or any combination of such features, be utilised for realising the invention in diverse forms thereof.

What we claim is:

1. An electrical storage heater comprising a heat store, electrical heating means for heating the heat store, a circuit including charge control means for regulating the flow of current to the electrical heating means during an off-peak charging period, means providing for flow of air or other heat distributing fluid into contact with the heat store and thereafter to a space or place to be heated, and flow control means for controlling the flow of heat distributing fluid, wherein the flow control means has associated therewith a setting means which is operative during an on-peak period to variably set the heat flow from the heater, and resetting means operative automatically to cancel the setting of the setting means during the next subsequent off-peak period.

2. An electrical storage heater according to claim 1 wherein the setting means can be operated at any stage during an on-peak period, and comprises a manually-operative boost switch to increase the heat delivered by the heater, the resetting means being operative to reset the boost switch during the next subsequent off-peak period.

3. An electrical storage heater according to claim 1 wherein the setting means is automatically operative to induce a bias to compensate for the level of charging of the heater at the end of one off-peak period, the resetting means being operative to remove the bias on commencement of the next subsequent off-peak period in preparation for the provision of another bias at the end of said next off-peak period.

4. An electrical storage heater according to claim 1 wherein the flow control means comprises a damper or valve element movable relative to an air flow passage extending through the store to control air flow therethrough, the setting means being operative to adjust the initial setting of said damper or valve element.

5. An electrical storage heater according to claim 1 wherein the setting means comprises a thermometer element partaking of the temperature of the store to provide an output for operating the setting means.

6. An electrical storage heater according to claim 1 wherein the setting means is manually operated.

7. An electrical storage heater according to claim 1 wherein the setting means includes latch means for holding the setting means in an adjusted position, the resetting means moving the latch means to an inoperative position during each off-peak period.

8. An electrical storage heater according to claim 7 wherein the resetting means is operative physically to return the setting means to a base position.

9. An electrical storage heater according to claim 7 wherein the flow control means comprises a damper or valve element movable relative to an air flow passage extending through the store to control air flow therethrough, wherein the setting means further comprises a stop element and a thermometer element partaking of the temperature of the store, and wherein the initial setting of the damper or valve element is determined by the stop element in the setting means, such stop element being itself positionally adjusted by the thermometer element, and being held in its adjusted position by said latch means.

10. An electrical storage heater according to claim 1 in which the flow control means comprises a member which is movable to vary the response of the flow control means to predetermined input parameters and the setting means comprises a latch member which restrains the moveable member in a set position in which a desired bias to the response of the flow control means is obtained.

11. An electrical storage heater according to claim 10 in which the resetting means also comprises a thermoresponsive element.

12. An electrical storage heater according to claim 11 in which the thermo-responsive element is activated during charging of the storage heater.

* * * * *